United States Patent
Buchmann

(10) Patent No.: US 11,941,386 B2
(45) Date of Patent: Mar. 26, 2024

(54) FLEXIBLE PROVISION OF MULTI-APPLICATION CONTENT

(71) Applicant: SAP SE, Walldorf (DE)

(72) Inventor: Daniel Buchmann, Karlsruhe (DE)

(73) Assignee: SAP SE, Walldorf (DE)

( * ) Notice: Subject to any disclaimer, the term of this patent is extended or adjusted under 35 U.S.C. 154(b) by 143 days.

(21) Appl. No.: 17/451,468

(22) Filed: Oct. 19, 2021

(65) Prior Publication Data

US 2023/0119418 A1    Apr. 20, 2023

(51) Int. Cl.
| G06F 9/44 | (2018.01) |
| G06F 8/61 | (2018.01) |
| G06F 9/445 | (2018.01) |
| G06F 16/22 | (2019.01) |

(52) U.S. Cl.
CPC ............ *G06F 8/61* (2013.01); *G06F 16/22* (2019.01)

(58) Field of Classification Search
CPC .................................. G06F 8/61; G06F 16/22
See application file for complete search history.

(56) References Cited

U.S. PATENT DOCUMENTS

| 10,824,648 | B2 * | 11/2020 | Srivastava | G06F 8/61 |
| 2014/0372998 | A1 * | 12/2014 | Salameh | G06F 8/65 |
| | | | | 717/169 |
| 2017/0078377 | A1 * | 3/2017 | Smith | H04L 67/06 |
| 2019/0235852 | A1 * | 8/2019 | Bartolotta | G06F 8/65 |
| 2019/0243665 | A1 * | 8/2019 | Bolik | G06F 8/60 |
| 2021/0081408 | A1 * | 3/2021 | Schwan | G06F 16/211 |
| 2021/0191983 | A1 | 6/2021 | Teichmann et al. | |
| 2021/0271493 | A1 * | 9/2021 | Stockert | G06F 8/75 |
| 2021/0373878 | A1 * | 12/2021 | Padmanabhan | G06F 11/3664 |
| 2022/0012032 | A1 * | 1/2022 | Johari | G06F 9/44505 |
| 2022/0114238 | A1 * | 4/2022 | Padmanabhan | G06F 21/12 |

(Continued)

FOREIGN PATENT DOCUMENTS

| CN | 110830468 A | * | 2/2020 | G06F 21/604 |
| CN | 111930382 A | * | 11/2020 | G06F 16/986 |
| KR | 2010081522 A | * | 7/2010 | G06F 17/30861 |

OTHER PUBLICATIONS

Eva Gerbert-Gaillard, A self-aware approach to context management in pervasive platforms, 2017, pp. 1-6. https://ieeexplore.ieee.org/stamp/stamp.jsp?tp=&arnumber=7917568 (Year: 2017).*

(Continued)

*Primary Examiner* — Mongbao Nguyen
(74) *Attorney, Agent, or Firm* — Klarquist Sparkman, LLP

(57) ABSTRACT

Techniques and solutions are described for defining and deploying application content. Content, such as objects, can be created in a repository defined for a first application. A package can be defined based at least in part on the objects for use in a computing environment only requiring the first application. A second package can be defined based at least in part on the objects for use in a computing environment in which both the first application and a second application are available. Content can be moved between repositories defined for a single application and repositories defined for multiple applications. Content can be added to, or removed from, a client computing system as applications available on a client computing system change.

20 Claims, 9 Drawing Sheets

(56) References Cited

U.S. PATENT DOCUMENTS

| | | | |
|---|---|---|---|
| 2022/0309041 A1* | 9/2022 | Whitechapel | G06F 8/61 |
| 2022/0335007 A1* | 10/2022 | Mohen | G06F 16/122 |
| 2023/0112606 A1* | 4/2023 | Verma | G06K 19/06037 |
| | | | 726/6 |

OTHER PUBLICATIONS

Michael Vogler, LEONORE—Large-Scale Provisioning of Resource-Constrained IoT Deployments, 2015, pp. 1-10. https://ieeexplore.ieee.org/stamp/stamp.jsp?tp=&arnumber=7133516 (Year: 2015).*
Extended European Search Report received in European Patent Application No. 22201255.1, dated Mar. 3, 2023, 9 pages.

* cited by examiner

FLEXIBLE PROVISION OF MULTI-APPLICATION CONTENT

FIELD

The present disclosure generally relates to provisioning application content, such as application enhancements or content that can be used with or by applications. Particular implementations allow packages to be defined that include enhancements or content by a single application or packages that include enhancements or content that are usable when the single application and another application are usable by a client.

BACKGROUND

Software is becoming increasingly complex. Particularly as available memory, disk storage, and processing capacity expand, developers can include more functionality, and more sophisticated functionality in software. That functionality can be later expanded and updated, including by a larger number of entities. For example, if a software suite is released by one company, other companies, or even individual users, may develop products (code or non-code content, where non-code content can be, for example, a data model or elements thereof) that operate in conjunction with the software suite to provide additional functionality, or which provide foundational material that users may build upon. This added functionality can be incorporated into products that are made available for sale, or content can be shared among users of the software application.

However, various barriers exist in sharing and deploying software updates or content. For example, it can be a complex endeavor to gather materials for an update or sharing, and so updates or new content may be released relatively infrequently. In addition, some updates or content may be limited to particular software products. If a user has a combination of software products where the update or content may be useful, but the update or content requires a license to content specific to the two applications being used together, then the user may not be able to take advantage of the update or content. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for defining and deploying application content. Content, such as objects, can be created in a repository defined for a first application. A package can be defined based at least in part on the objects for use in a computing environment only requiring the first application. A second package can be defined based at least in part on the objects for use in a computing environment in which both the first application and a second application are available. Content can be moved between repositories defined for a single application and repositories defined for multiple applications. Content can be added to, or removed from, a client computing system as applications available on a client computing system change.

In one embodiment, the present disclosure provides a method for defining different packages of objects, such as a package that can be installed when a first application is available at a target system and a package that can be installed when the first application and a second application are available. A first plurality of first objects useable with a first application are received. The first plurality of objects, or references thereto, are stored in a repository. A second plurality of objects useable with the first application when a second application is also installed at a target system are received. The second plurality of objects, or references thereto, are stored in the repository. A first package is defined that includes at least a portion of the first plurality of objects but does not include objects of the second plurality of objects. A second package is defined that includes at least a portion of the second plurality of objects.

The present disclosure also includes computing systems and tangible, non-transitory computer readable storage media configured to carry out, or including instructions for carrying out, an above-described method (or operations). As described herein, a variety of other features and advantages can be incorporated into the technologies as desired.

DETAILED DESCRIPTION

Example 1—Overview

Figure 1:
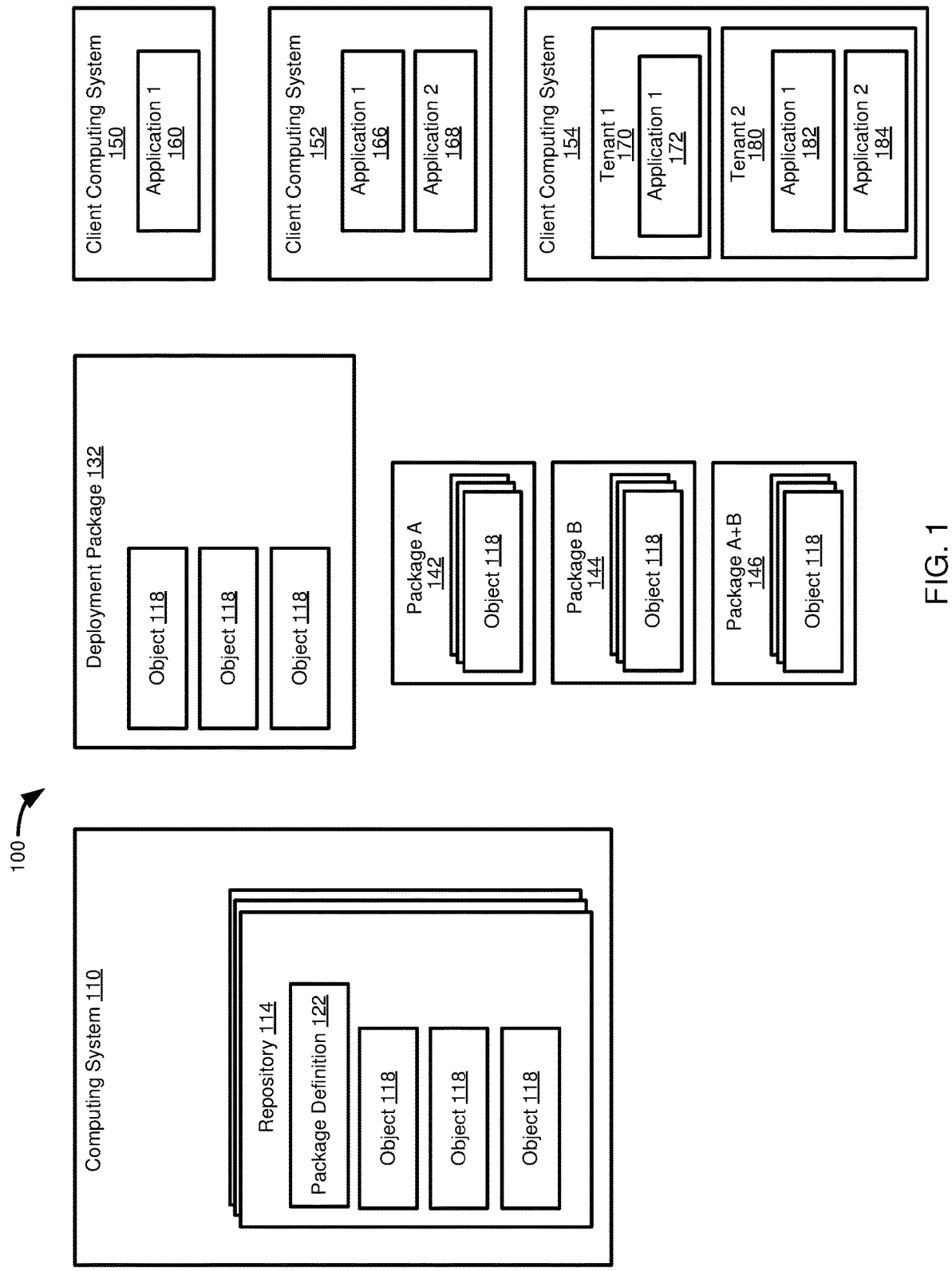
FIG. 1 is a diagram illustrating a computing environment having a repository that can be used to define packages that can be deployed to client computing systems.

Software is becoming increasingly complex. Particularly as available memory, disk storage, and processing capacity expand, developers can include more functionality, and more sophisticated functionality in software. That functionality can be later expanded and updated, including by a larger number of entities. For example, if a software suite is released by one company, other companies, or even individual users, may develop products (code or non-code content, where non-code content can be, for example, a data model or elements thereof) that operate in conjunction with the software suite to provide additional functionality, or which provide foundational material that users may build upon. This added functionality can be incorporated into products that are made available for sale, or content can be shared among users of the software application.

However, various barriers exist in sharing and deploying software updates or content. For example, it can be a complex endeavor to gather materials for an update or sharing, and so updates or new content may be released relatively infrequently. In addition, some updates or content may be limited to particular software products. If a user has a combination of software products where the update or content may be useful, but the update or content requires a license to content specific to the two applications being used together, then the user may not be able to take advantage of the update or content. Accordingly, room for improvement exists.

The present disclosure facilitates making cross application content available to clients. Cross application content generally refers to content for a first application that can also be used in a second application, or content that can be used by the first or second application in conjunction with the other application. An application, as used herein, can refer to a particular software application or a particular collection or grouping of data or metadata. For example, "application" can refer to a collection of data models useable in a particular field (or subject matter area), such as accounting or human resources.

Cross application content can be in the form of updates, upgrades, add-ins, or other programmatic enhancements to one or more applications, or can be in the form of content used by one or more applications (which can also "enhance" the application, such as by providing pre-built content for users). Such content can include models and elements thereof (e.g., database artefacts, elements of database artefacts, such as dimensions, dimensional hierarchies, data type definitions, semantic information associated with a database artefact or database artefact element, or artefacts or elements of artefacts in a virtual data model), key performance indicators (KPIs), role definitions, user definitions, connection definitions (e.g., information useable to connect one computing system to another computing system), files, user interface definitions and elements thereof, data structure definitions, definitions of abstract or composite data types or similar types of computing objects, themes, widgets, or validation rules. So, cross application content can include a particular element of a data model that is useable by a first software application when a client computing system also has a second software application available, or can refer to a particular element of a data model that is useable by the first software application in a first field (or "application," such as accounting) and in a second field (or "application," such as human resources).

Cross application content can be included in a package. A package generally refers to a collection of one or more, and typically a plurality of, cross application content. However, at least in technologies provided in the present disclosure, a package can include content that is specific to (only requires) a particular application, rather than being cross application content. A package can be a file or an object, and can optionally be compressed. In at least some cases, content associated with a package is included within the package. However, in other cases a package can include a list of content items, where the content items can be retrieved by a system using (e.g., installing) the package. When content is not included with the package, the package can include identifiers for content of the package or location information useable to retrieve package content.

A package can be associated with a data space (or object space or namespace) or repository. A package can be assembled from content in the data space, and a defined package can be included as an object in the data space. In particular implementations, multiple packages can be created from the data space, where different packages include different subsets of content in the data space.

Packages can be associated with one or more computing environments, such as applications or application suites. Different packages can be created for different computing environments. Or, a single package can include information useable to indicate what portions of the package should be installed in a particular computing environment. An example, one set of content can be included (or defined or extracted) if a computing environment only includes an application A. Another set of content can be included (or defined or extracted) if a computing environment includes both application A and an application B. Packages can be defined for any desired number or combination of applications or application components. Similar definitions can optionally be made based on add-ins associated with an application or application configuration information.

In some implementations, a particular package can be defined or selected for deployment based on the satisfaction of dependency requirements. For example, a package for application A may be defined and a package for a scenario where both application A and application B are available may be defined. Both packages may be made available, and a particular computer system can select, or have selected, a package which matches an environment of the computing system, such as selecting a package with the highest number of dependencies satisfied by the computing system (e.g., if the computing system has applications A, B, and C, a package that includes all three applications as dependencies will be selected over a package that includes only one or two of these applications). Or, a combined package can be defined that includes multiple sub-packages, and a receiving system (or user thereof) can select which sub-package to install (such as based on what dependency information is defined, although in at least some cases a sub-package may be installed that includes fewer dependencies than are satisfied by the computing environment).

Although packages can be defined with respect to a particular application or application suite, packages or package dependencies can be defined in other manners. For example, a package can be dependent on one or more other packages, rather than being dependent on a specific application or application suite. This may be useful when, for example, there are multiple packages available for a given application or application suite—a client system may have an application or application suite installed, but may not have installed all packages that are available for that application or application suite.

Disclosed technologies can provide a number of advantages. Content or upgraded functionality can be provided to a larger number of clients by not requiring clients to have a license to a specific cross application combination in order to use at least some functionality associated with a cross application. It can also make the functionality available more quickly to users, even if the functionality is eventually rolled into a cross application. Having cross application content available to users can create client interest in obtaining a full license to a cross application (e.g., a package that may require a separate license and may contain more extensive or complex cross application content) to gain access to additional functionality or content as compared with what might be made available in a package primarily defined with respect to one application, with some content or feature that will be installed/useable if one or more additional applications happen to be available on a client system.

Although not limited to such use, the present disclosure can find particular use in the SAP Analytics Cloud software available from SAP SE, of Walldorf, Germany. In this implementation, a package can be a ACN (Analytics Content Network) package. Content included in an ACN package can be objects as used in SAP Analytics Cloud, and an application can be a Line of Business. A repository or object space can be a Data Plane space as used in SAP analytics cloud.

Example 2—Example Computing Environment

FIG. 1 illustrates an example computing environment 100 in which disclosed technologies can be implemented. The computing environment 100 includes a computing system 110 where a variety of content can be defined or maintained. As descried in Example 1, the content can be code, such as code that updates or upgrades, or acts as an add-on to, an application. The content can also be non-code content, such as definitions of components of a data model, which can be expressed in formats such as JSON and CSN (core schema notation, as used in software available of SAP SE of Walldorf, Germany. Content (e.g., a particular file having a CSN or JSON listing, a program) can be generally referred to as an "object," although it should be appreciated that, in this usage, an "object" need not be a software object as that term is used in object-oriented programming, although such a software object can also be an "object."

The computing system 110 has a repository 114 that can store a plurality of objects 118, where all or a portion of the objects can be included in a package definition 122. The package definition 122 in some cases includes, or results in, a deployment package 132, that includes the appropriate objects 118. In some cases, content of the objects 118 is directly included in the deployment package 132. In other cases, the deployment package 132 references objects 118 in the repository 114 (or another location) and a system on which the deployment package is installed retrieves the objects 118 from the repository (or other location) during installation.

The repository 114 can be one of multiple repositories in the computing system 110. For example, a repository 114 can be defined for a particular software application or software suite to help organize objects 118, although some objects may exist in multiple repositories. Or, a repository 114 can be created for a particular subject matter area, such as accounting or human resources, where objects 118 in the repository can be useable by one or more specific applications, or can be at least partially application agnostic. For example, an object 118 can be a definition of a database object, and can be used by any application that is capable of reading a format in which the object is expressed.

The computing environment 100 is shown as including three packages 142, 144, 146, where each package is configured to be installed in an environment satisfying particular requirements. The packages 142, 144, 146 can be package definitions in the repository 114 (e.g., examples of the package 122), or can be deployment packages (e.g., examples of the package 132). Each of the packages 142, 144, 146 includes one or more objects 118 from the repository 114, or references to such objects. Package 142 includes content useable with a first application, where the package 142 is thus dependent on the first application. Similarly, package 144 includes content useable with a second application. Package 146 includes content useable with the first application and/or the second application, but depends on both applications 1 and 2 being installed (or otherwise available in) on a target system. Traditionally, not only would applications 1 and 2 need to be deployed to a client system, but the client would also need a license to content that was associated with both applications (e.g., a license to the applications individually would not grant access to cross application content). In some cases, a cross application package refers to a package that does not include objects 118 that are "local" (that only require) a single application.

As will be further described, the present disclosure provides techniques that move cross-application dependencies to a lower/more granular level, thus helping avoid situations where the lack of a license to a high-level software application or software package prevents the incorporation of features that might increase the utility of another software application or software package. That is, instead of having the availability of a feature for a second application depend on having a license to a product defined for cross-application content for the second application and a first application, the availability of the feature can instead depend on whether a particular system has software functionality available that would be needed in order for the feature to be used, such as checking to see whether a particular system has particular applications or particular content installed. Thus, for example, so long as application 1 and application 2 are available, a system can use cross-application content for application 1 with respect to application 2, or for application 2 with respect to application 1. In another example, a feature for application 1 can be used as long as particular content or features are available, which may be content or features that are associated with an application 2.

The computing environment 100 includes three client computing systems 150, 152, 154. The packages 142, 144, 146 that can be installed on one of the client systems 150, 152, 154 depends on the applications installed on (or otherwise available at/to) the client system. For example, client computing system 150 includes a copy 160 of a first application. Since package 142 only requires the first application, the package 142 can be installed on the client computing system 150. Packages 144 and 146 cannot be installed on the client computing system 150, since that client system does not include a second application, on which such packages are dependent.

Client computing system 152 includes a copy 166 of the first application and a copy 168 of the second application. Accordingly, the client computing system 152 can install one or more of the package 142 (requiring only the first application), the package 144 (requiring only the second application), or the package 146 (requiring both the first and second applications).

Client computing system 154 is a multitenant system, having a first tenant 170 and a second tenant 180. The first tenant 170 has a copy 172 of the second application available, but does not have access to the first application. Thus, only the package 144 can be installed for the first tenant. The second tenant 180 has a copy 182 of the first application and a copy 184 of the second application, and thus one or more of the packages 142, 144, 146 can be installed for the second tenant.

Example 3—Example Cross Application Content

Figure 2:
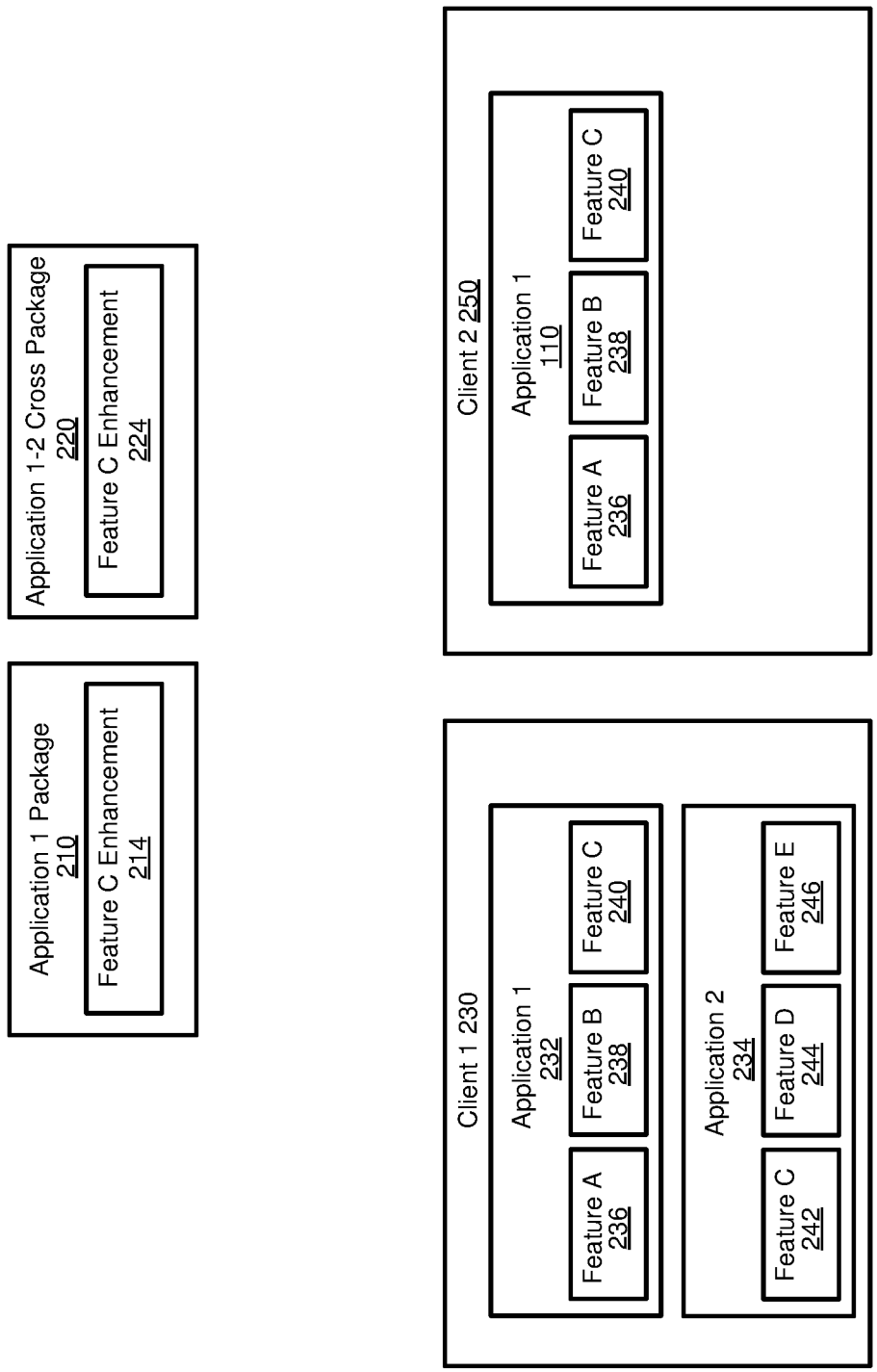
FIG. 2 is a diagram illustrating how an application can have content that is useable if another application is available.

FIG. 2 illustrates how packages, either definitions of packages in a repository or deployment packages, can include content or an enhancement for a single application or content or an enhancement that provides benefit when multiple applications are used together. In particular, FIG. 2 illustrates a first package 210 for a first application, which includes an enhancement 214 for a particular feature, feature C, of the first application. A second package 220 also includes an enhancement 224 for feature C of the first application. However, while the first package 210 requires only the first application, the second package 220 requires the first application and the second application.

FIG. 2 illustrates that some content and enhancements can be for a single application used in isolation, yet other content and enhancements apply when two applications are used together, or at least are available. For instance, FIG. 2 illustrates a first client system 230 that has a copy 232 of the first application installed, and a copy 234 of the second application installed. The first application has components or features A-C, 236, 238, 240, and the second application has components or features C-E, 242, 244, 246. The two versions of features C, 240, 242, can represent the same feature, but in two applications, natively. Or one version of feature C can be added by the package 220 to the first application or the second application.

As a more practical example, consider a scenario where the first application is a human resources application and the second application is a financial application. Feature C 240 may relate to employee performance records. If a client has the second application installed in addition to the first application, human resource functionality may be useful in the financial application—such as tying employee performance information to sales or production data. Thus, including feature C 242 can be beneficial to the client system 230, as it can increase the usefulness of the second application.

A second client system 250 only has the first application installed, with its features 236, 238, 240. Since the second client system 250 does not have the second application installed, installing the package 220 would either not be possible, or would not provide any benefit to the second client system 250 even if it could be installed. On the other hand, the first package 210 enhances the features or content of the first application standing alone, and so is useful to provide the first package to both the first client system 230 and the second client system 250.

Example 4—Example Alternative Package Definitions

As discussed in Example 1, existing techniques for enhancing applications can be limited in situations where an enhancement involves multiple applications. Because of the time required to develop packages, and licensing requirements, often enhancements involving multiple applications working together are only made available when they are of sufficient quantity or nature that a specific cross product is developed, where the cross product typically requires an additional (paid) license as compared with the applications considered separately. That is, even if an enhancement requires a first application and a second application, and a particular client has licenses to both applications, features that relate to the combination of the first and second applications may only be available if the client obtains a separate license to the cross-product obtained when the first and second applications are used together.

Figure 3:
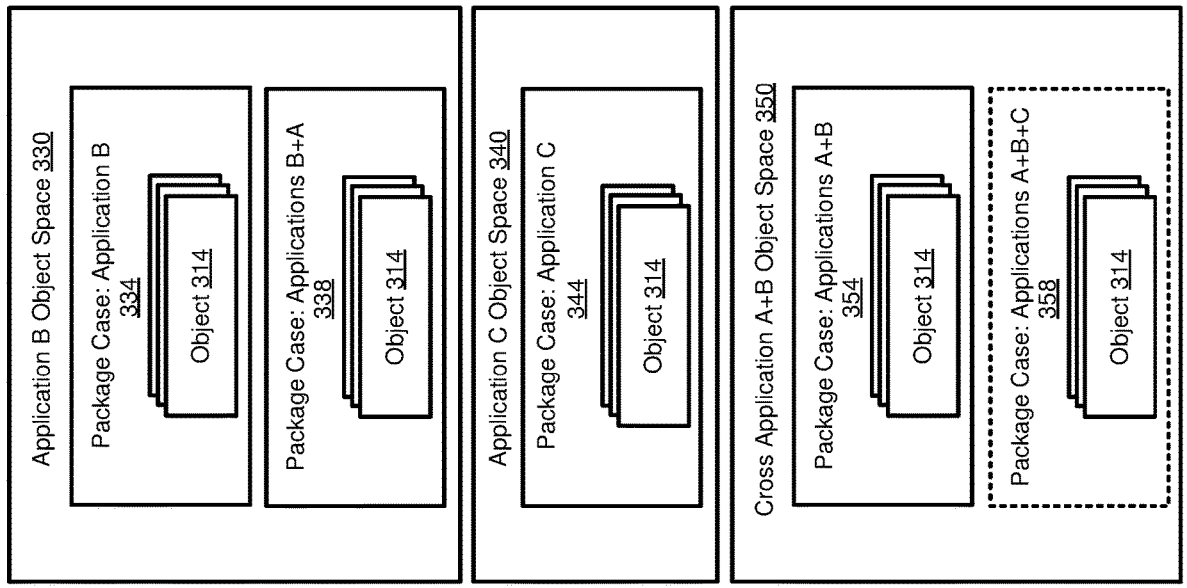
FIG. 3 is a diagram illustrating how packages can be created for different potential computing environments that might be present on a client computing system.
Figure 3:
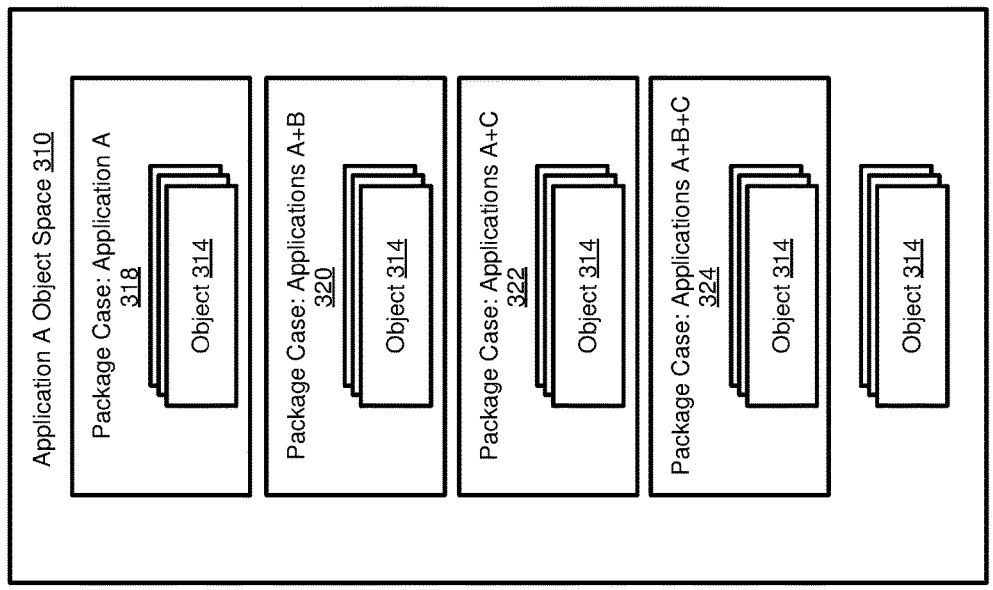

FIG. 3 illustrates how cross application enhancements can be facilitated by creating additional packages for cross application enhancements in a repository defined for a single application. In particular, FIG. 3 illustrates a first object space 310, which can be all or a portion of a first repository (e.g., the repository 114 of FIG. 1). The first object space 310 includes a plurality of objects 314, which can be the objects 118 of FIG. 1.

The first object space 310 also include packages 318, 320, 322, 324, which can be analogous to the package definition 122 of FIG. 1. As was the case in FIG. 1, one of the packages, package 318, can be specific to a scenario where a first application is to be enhanced or updated. The additional packages 320, 322, 324 can defined to be dependent on the first application and one or more additional applications. In particular, package 320 requires application A and application C, package 322 requires application A and application C, and package 324 requires applications A, B, and C.

As described in Example 3, an enhancement or update that is dependent on multiple applications can indicate that both applications include a common component or feature, or the dependency can arise from the need for a component or feature of a second application to be available to use enhanced or updated functionality of a first application. For example, say an enhancement for a first application is the creation or modification of a data model (e.g., a definition of a table) to include data representing a particular attribute (e.g., a particular field or column of a database table). Including this attribute in data model for the first application may only "make sense" if the second application is available, as the second application may be the source of the data used to obtain values for the attribute.

In some cases, packages 318-324 can be defined to be independent. That is, for example, one package can be created for each unique computing environment (combination of applications) and all relevant objects are included in, or referenced by, the package. So, in the above example, the package 320 includes all of the objects 314 relevant for application A when used alone and all of the objects for a scenario where application A is used with application B (where, if any objects are inconsistent with the objects for the application A-only scenario, the objects for the application A+application B scenario are used instead) are included in the package. In other cases, packages 318-324 can be additive. For example, if a client computer system included application A and application B, package 318 could be installed to provide the updates or enhancements when application A is used alone, and package 320 can be installed to provide the updates or enhancements specific to the use of applications A and B together. In the case where applications A, B, and C are available, package 318 could be used to install updates or enhancements for application A used alone, package 320 can be used to deploy enhancements or updates relevant to applications A and B used together, and package 322 can be used to deploy enhancements or updates relevant to applications A and C being used together. In this scenario, it may not be necessary to define package 324 specific to a scenario where applications A-C are used together.

In yet further cases, a single package can include objects 314 for multiple scenarios, and installation logic can be used to determine what packages should be installed (and optionally retrieved, if the installation logic is not part of a package). For instance, package 320 can include all of the objects 314 for application A and all of the objects for the scenario where application A is used with application B. During deployment, it can be determined whether only application A is available, in which case only the objects 314 specific to application A are deployed, or whether both applications A and B are available, in which case all of the objects (or at least all of the objects defined for the application A+application B use case) can be deployed. Similarly, if an application is installed, new content may be available for previously installed applications, and so it may be desirable to not just check what content or features can be installed for a newly installed application, but to check whether content or features can be added for previously installed applications. Correspondingly, the removal of an application (or content or features, depending on how dependencies are tracked or defined) may result in some cross-application content for other applications no longer being useable, and so it may be desirable to consider whether the removal of an application should result in the removal of cross-application features or content for remaining applications.

FIG. 3 illustrates an object space 330 for an application B that contains packages 334 and 338. Package 334 contains objects 314 specific for application B, while package 338 contains objects for when application B is used with application A. Generally, the packages 334 and 338 can be implemented as described for the packages 318, 320. In some cases, at least some of the objects 314 in the package 338 can be the same as objects in the package 320. That is, a same object 314 can be useful any time application A is used with application B. However, not all objects 314 need be transitive. For example, it may be desirable to include an object 314 in a package for a "primary" application, where an application can be considered primary if the application is modified by the object or if the application primarily uses the object. In the example above where an object 314 represents an attribute for a table, it may be desirable to include the object in a package for an application that has the table, rather than in the application from which data is obtained. In yet further examples, multiple objects 314 may be required to implement particular functionality, and some of the objects can be in a package for a first application (A+B) and other objects can be in a package for the second application (B+A).

The object spaces 310, 330, and their associated packages, can represent an intermediate stage between the packages 142, 144, 146 described in Example 2. That is, object space 340 for an application C includes a package 344 that contains content that is purely associated with application C (local content). Object space 350 includes a package 354 and is strictly defined for a scenario where two applications are available and fully licensed to a client. Packages 320, 322, or 324 of the object space 310, on the other hand, include local content and some additional content that is related to one or more other applications, but do not require a fully defined (and restricted) cross application. That is, the useability of the packages 320-324 depends on the appropriate application being available on a client system, rather being dependent on whether a client system has a license for content that is associated with multiple applications. In a more specific implementation, a package associated with multiple applications, such as package 320, is useable as long as the appropriate "base" packages are available. So, package 320 could be used by a client system as long as package 318 was also deployed to the client system.

In addition, although this Example 4 describes "local plus" scenarios that are defined with respect to a single "base" application, these scenarios can also apply to cross applications. For example, object space 350 optionally includes a cross application package 358 that is defined for a scenario where a client system includes applications A and B (and has permission to access cross application content) and further includes an application C. The package 354, 358 can otherwise be implemented as described for the packages 318, 320.

Example 5—Example Package Definitions

Figure 4:
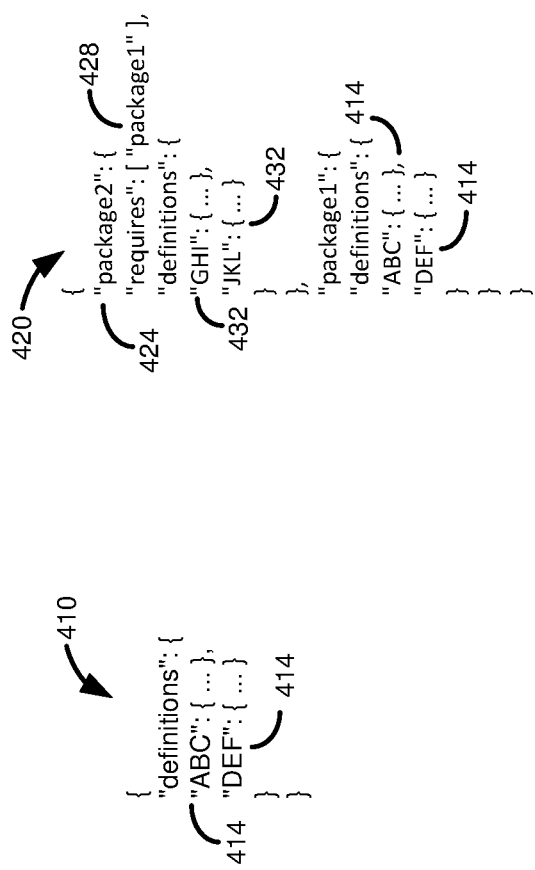
FIG. 4 are example package definitions illustrating how application dependencies can be incorporated into a package definition.

FIG. 4 contains a partial definition 410 (in CSN, core schema notation, as used in products available from SAP SE, of Walldorf, Germany) for a package that is dependent on a single application and a definition 420 for a package that is dependent on multiple applications. The package 410 can thus represent an example of the package 142 of FIG. 1 or the package 318 of FIG. 3. The package 410 includes definitions for two objects 414. In this case, no name is given for the package, although one can be included in some implementations. In some cases, it can be assumed that a particular repository (or object space/namespace) is for a particular application.

The package 420 includes a name 424 for a package being defined ("package 2") and includes dependency information 428, indicating that "package 1" is required for the installation of package 2. The package 420 includes definitions 432 for objects of the second packages, and also includes the definitions 414 of any objects included in package 2 from package 1.

Package 410 thus represents features and enhancements that are specific to package 1 (which in turn may be associated with a first particular application), or "local" content, while package 410 includes "local content" (the definitions for the objects 414) and additional content (the definitions of objects 432) useable when package 2 (for a second application) is available.

Example 6—Example Migration of Content Between Single and Cross Application Spaces As discussed in Example 1, the present disclosure facilitates between making content available in a middle ground between application content made available strictly for a single application and having cross-application content available as a formal "product" (which can require a separate license). Some enhanced application functionality taking advantage of the availability of another application or content can be included in content for a "base" application or content. Over time, it may be desired to change a definition of what content should be made available in a "local plus" format (base application/content plus cross content) or strictly as cross-application content (which can require an additional license). Packages can be modified to account for these transitions, which provides flexibility compared with approaches where content is either included in a specific cross-application product or in a "primary" product. That is, in prior approaches, creating or changing cross-application products or changing available features or content in a given product was relatively difficult, given the small number of vehicles for making changes and because it can be impractical to make relatively frequent changes to such comprehensive products. In at least certain disclosed embodiments, content can be added to or removed from different application or cross-application packages as in prior approaches, but smaller, more frequent updates or changes can also be made, so long as the requisite application(s) and content is available at a given system.

Figure 5A:
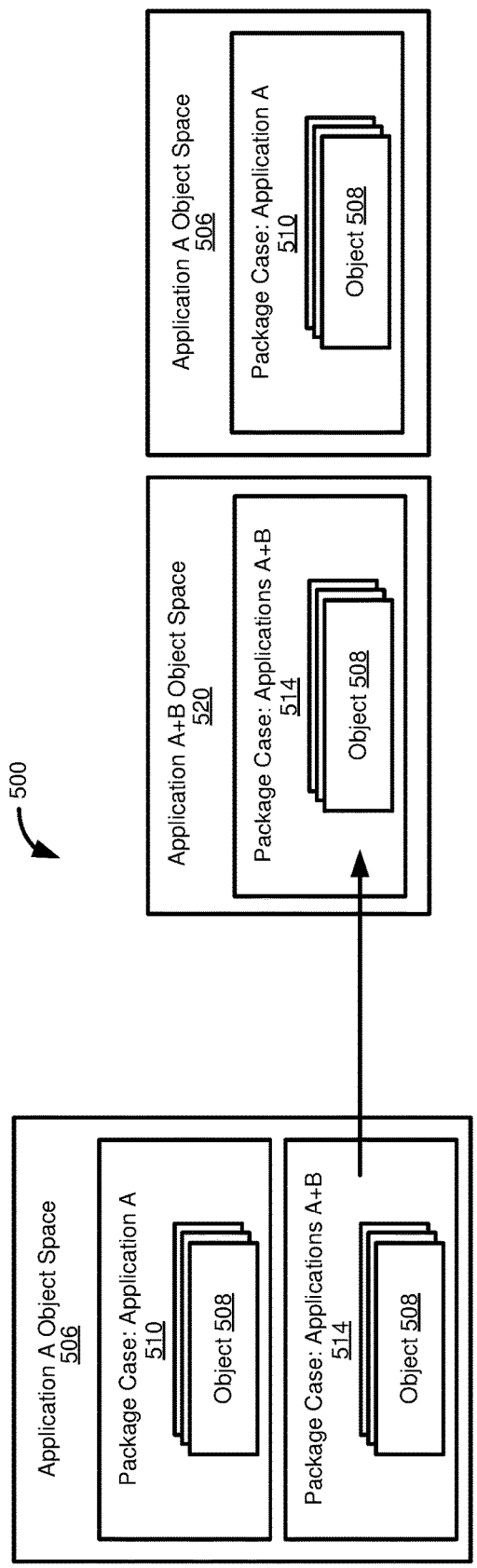
FIGS. 5A and 5B illustrate how content can be migrated between cross application object spaces and single application object spaces.

FIG. 5A illustrates a scenario 500 where an object space 506 for a first application, application A, has objects 508. The object space 506 includes a package 510 with base content and a package 514 for content that is useable if a client also has application B available. In other words, package 514 represents "local plus" content. It may be decided that at least a portion of the contents of package 514, or at least contents that are specific to the combination of application A and application B, are sufficiently valuable that they can be included in a cross-application package, where such inclusion may require a customer to pay for content rather than having the content available for no additional cost in the "local plus" paradigm.

Accordingly, the package 514, or particular contents thereof, can be transferred to an object space 520 that is specific to a combination of application A and application B. The object space 506 retains the package 510 that contains content specific for application A.

In a similar manner, over time, it may be desired to take content from an object space associated with multiple applications and make it available in an object space for a single application. Thus, the content would be available to users who had both application A and application B available, even if they did not have a license to content of an object space defined as including both application A and application B.

Figure 5B:
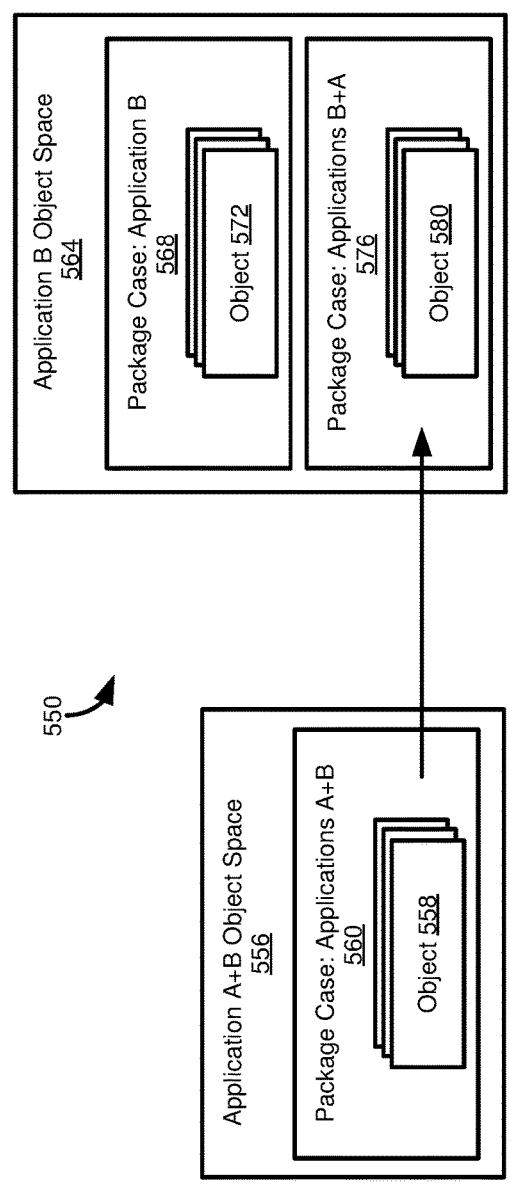

FIG. 5B illustrates this scenario 550, where an object space 556, having objects 558, that are specific to the combination of application A and application B includes a package 560 that includes objects associated with the combination of application A and application B. At least a portion of the content associated with the combination of application A and application B is moved to an object space 564 associated with application B. The object space 564 includes a package 568 that has objects 572 that only require application A, and a package 576 that has objects 580 that are specific to the combination of application A and application B. In this scenario, all content of the package 558 has been incorporated into the package 576, and so the package 558 is no longer shown. On other cases, only a portion of the package 558 is incorporated into the package 576, and so the package 560 can remain with objects 558 that were not incorporated in the package 576.

Example 7—Example Modification of Content on a Client System Based on Application Availability Clients can add or remove applications to a computing system over time. When content is available that assumes the presence of a particular combination of applications, whether a client can use such content can change as the client adds or removes applications. If the client removes an application, it can be beneficial to determine if there is some content that is no longer useable by the client, and to optionally remove or disable such content. Similarly, if the client adds an application, it may be beneficial to see if new content is useable by the client (e.g., see if the first application can now use cross content that also requires a second application). If new content is useable, it can be useful to provide a notification to the client (or to users associated with the client) of the availability of the new content.

Figure 6A:
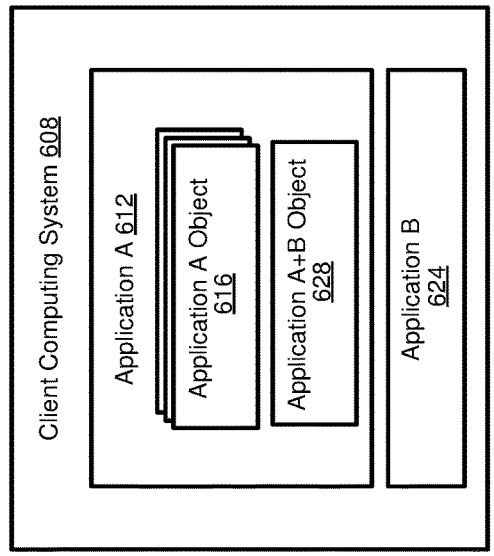
FIGS. 6A and 6B illustrate how content can be added to, or removed from, a client computing system as applications available on the client computing system change over time.
Figure 6A:
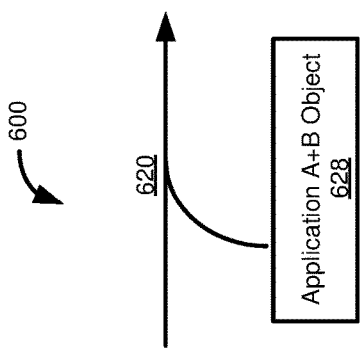
Figure 6A:
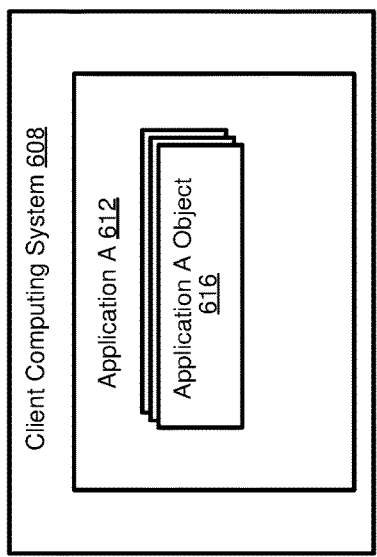

FIG. 6A illustrates a scenario 600 when additional content is made available to a user. A client computing system 608 includes an application 612, application A, that has one or more objects 616 that only require application A. At 620, the client installs application B 624. The client computing system 608 can determine that an object 628 for application A that depends on also having application B available is now useable by the client computing system and so the object is installed at the client computing system. The logic for analyzing whether objects can be added can reside in the application A 612, the application B 624, or in another component, such as a content manager component or an installation component.

Figure 6B:
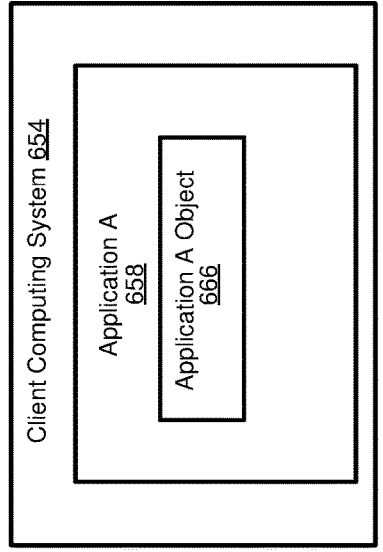
Figure 6B:
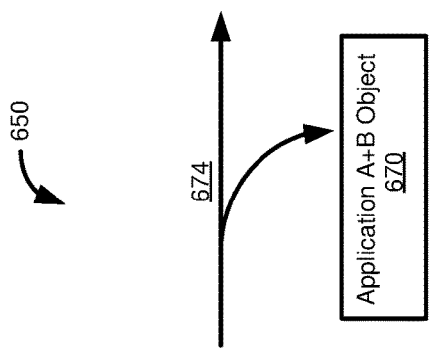
Figure 6B:
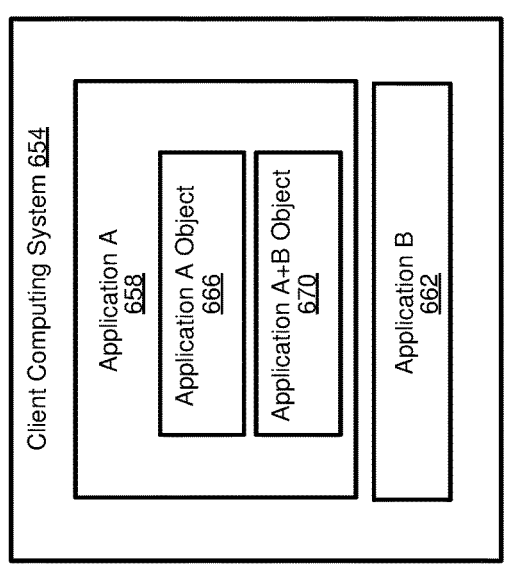

FIG. 6B illustrates a scenario 650 where content is no longer useable by a client, such as because the client removed an application that was required in order for the content to be useable. A client computing system 654 includes an application 658, application A, and an application 662, application B. Application A 658 includes content 666 that is specific to application A and content 670 that is useable if application B is also available. At 674, application B is removed from the client computing system 654. Logic determines that application B 662 has been removed, and looks for, and removes or disables, the content 670. After the "offboarding" process, application A 658 only includes the content 666.

Example 8—Example Implementations

Figure 7:
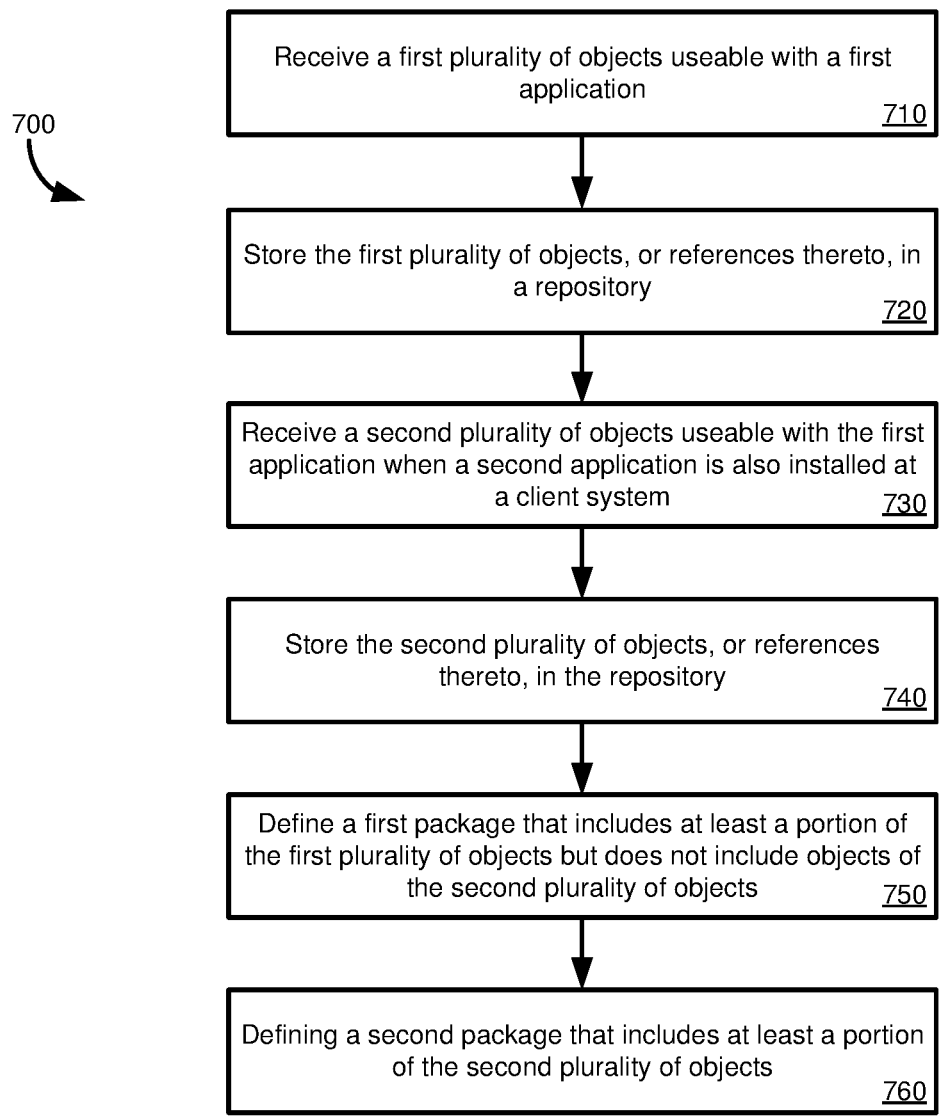
FIG. 7 is a flowchart illustrating operations according to a disclosed embodiment.

FIG. 7 illustrates a flowchart of an example method 700 for defining different packages of objects, such as a package that can be installed when a first application is available at a target system and a package that can be installed when the first application and a second application are available. The method 700 can be implemented in the computing environment 100 of FIG. 1, and more particularly can be implemented consistent with the environment shown in FIG. 3.

At 710, a first plurality of first objects useable with a first application are received. The first plurality of objects, or references thereto, are stored in a repository at 720. At 730, a second plurality of objects useable with the first application when a second application is also installed at a target system are received. The second plurality of objects, or references thereto, are stored in the repository at 740. A first package is defined at 750 that includes at least a portion of the first plurality of objects but does not include objects of the second plurality of objects. A second package is defined at 760 that includes at least a portion of the second plurality of objects.

Example 9—Computing Systems

Figure 8:
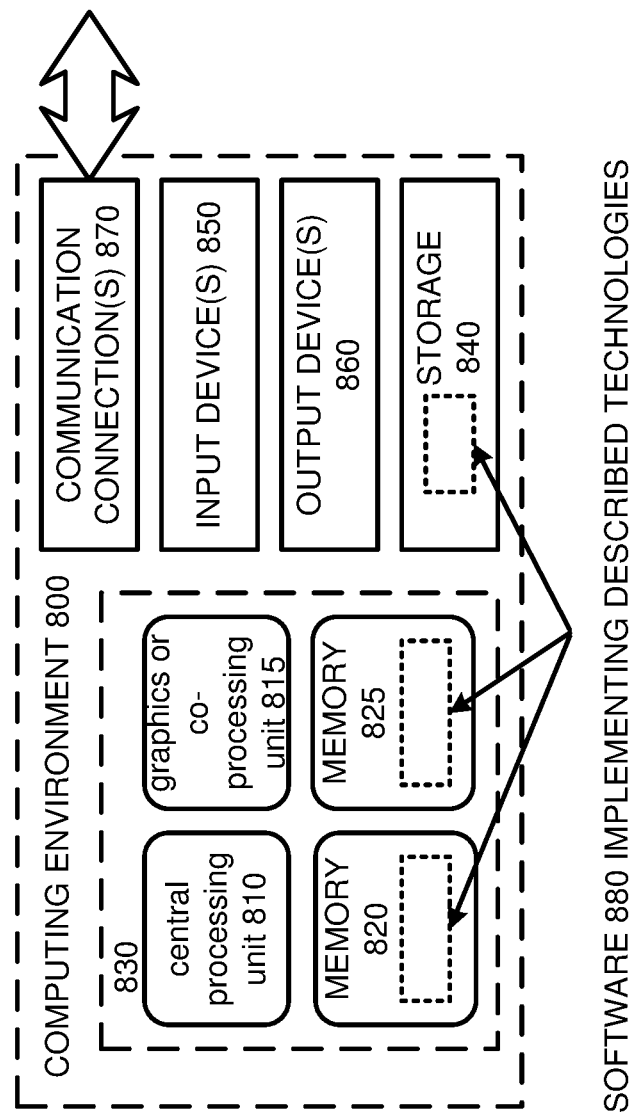
FIG. 8 is a diagram of an example computing system in which some described embodiments can be implemented.

FIG. 8 depicts a generalized example of a suitable computing system 800 in which the described innovations may be implemented. The computing system 800 is not intended to suggest any limitation as to scope of use or functionality of the present disclosure, as the innovations may be implemented in diverse general-purpose or special-purpose computing systems.

With reference to FIG. 8, the computing system 800 includes one or more processing units 810, 815 and memory 820, 825. In FIG. 8, this basic configuration 830 is included within a dashed line. The processing units 810, 815 execute computer-executable instructions, such as for implementing components of the environment 100 of FIG. 1, including as described in Examples 1-8. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s) 810, 815. The memory 820, 825 stores software 880 implementing one or more innovations described herein, in the form of computer-executable instructions suitable for execution by the processing unit(s) 810, 815.

A computing system 800 may have additional features. For example, the computing system 800 includes storage 840, one or more input devices 850, one or more output devices 860, and one or more communication connections 870. An interconnection mechanism (not shown) such as a bus, controller, or network interconnects the components of the computing system 800. Typically, operating system software (not shown) provides an operating environment for other software executing in the computing system 800, and coordinates activities of the components of the computing system 2300.

The tangible storage 840 may be removable or non-removable, and includes magnetic disks, magnetic tapes or cassettes, CD-ROMs, DVDs, or any other medium which can be used to store information in a non-transitory way, and which can be accessed within the computing system 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing system 800. The output device(s) 860 may be a display, printer, speaker, CD-writer, or another device that provides output from the computing system 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 10—Cloud Computing Environment

Figure 9:
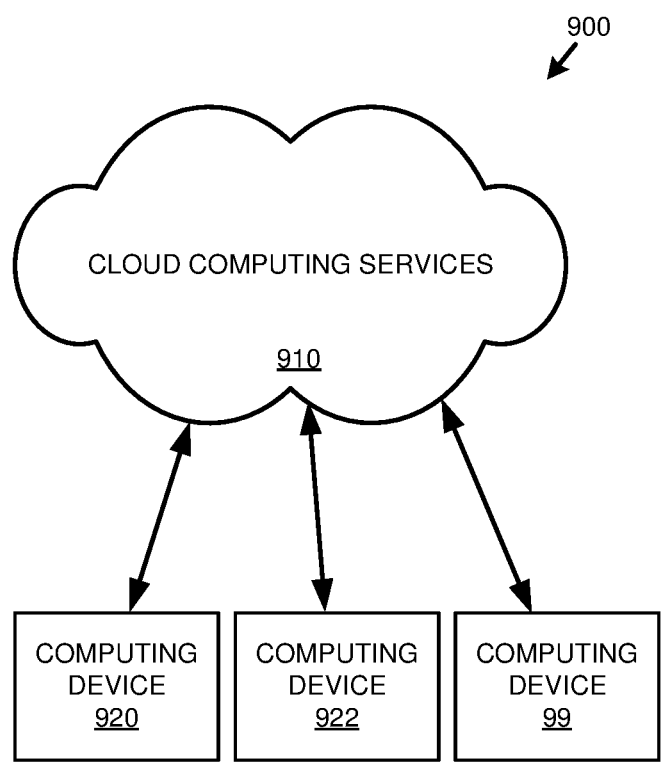
FIG. 9 is an example cloud computing environment that can be used in conjunction with the technologies described herein.

FIG. 9 depicts an example cloud computing environment 900 in which the described technologies can be implemented. The cloud computing environment 900 comprises cloud computing services 910. The cloud computing services 910 can comprise various types of cloud computing resources, such as computer servers, data storage repositories, networking resources, etc. The cloud computing services 910 can be centrally located (e.g., provided by a data center of a business or organization) or distributed (e.g., provided by various computing resources located at different locations, such as different data centers and/or located in different cities or countries).

The cloud computing services 910 are utilized by various types of computing devices (e.g., client computing devices), such as computing devices 920, 922, and 99. For example, the computing devices (e.g., 920, 922, and 99) can be computers (e.g., desktop or laptop computers), mobile devices (e.g., tablet computers or smart phones), or other types of computing devices. For example, the computing devices (e.g., 920, 922, and 99) can utilize the cloud computing services 910 to perform computing operators (e.g., data processing, data storage, and the like).

Example 11—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 23, computer-readable storage media include memory 2320 and 2325, and storage 2340. The term computer-readable storage media does not include signals and carrier waves. In addition, the term computer-readable storage media does not include communication connections (e.g., 2370).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, C#, Java, Perl, JavaScript, Python, Ruby, ABAP, SQL, XCode, GO, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
   at least one hardware processor;
   at least one memory coupled to the at least one hardware processor; and
   one or more computer readable storage media storing computer-executable instructions that, when executed, cause the computing system to perform operations comprising:
   receiving a first plurality of objects useable by a first application;
   storing the first plurality of objects, or references to the first plurality of objects, in a repository;
   receiving a second plurality of objects useable by the first application when a second application is also installed at a client system;
   storing the second plurality of objects, or references to the second plurality of objects, in the repository;
   defining a first package that comprises at least a portion of the first plurality of objects but does not comprise objects of the second plurality of objects useable by the first application when the second application is also installed at the client system;
   defining a second package that comprises at least a portion of the second plurality of objects useable by the first application when the second application is also installed at the client system;
   determining that a first client computing system has the first application installed but does not have the second application installed;
   deploying the first package and not the second package to the first client computing system;
   determining that a second client computing system has both the first application and the second application installed; and
   deploying at least the second package to the second client.

2. The computing system of claim 1, the operations further comprising:
   storing the first package and the second package in the repository.

3. The computing system of claim 2, wherein the first package and the second package are contemporaneously stored in the repository.

4. The computing system of claim 1, wherein the determining that the first client computing system has the first application installed by does not have the second application installed is carried out at a first time, the operations further comprising:
   at a second time, the second time being after the first time, determining that the first client computing system has the second application installed; and
   deploying one or more of the at least a portion of the second plurality of objects to the first client computing system.

5. The computing system of claim 4, the operations further comprising:
   providing a notification indicating that an object of the second plurality of objects, or a feature associated therewith, is now available at the first client computing system.

6. The computing system of claim 1, wherein the determining that the second client computing system has both the first application and the second application installed is made at a first time, the operations further comprising:
   at a second time, the second time being after the first time, determining that the second client computing system does not have the second application installed; and
   removing the at least a portion of the second plurality of objects from the second client computing system or otherwise making one or more of the at least a portion of the second plurality of objects unavailable to the second client computing system.

7. The computing system of claim 1, wherein the second package comprises at least a portion of the first plurality of objects.

8. The computing system of claim 1, wherein the first package comprises contents of the at least a portion of the first plurality of objects.

9. The computing system of claim 1, wherein the first package comprises references to objects of the at least a portion of the first plurality of objects but does not comprise all content of the objects of the at least a portion of the first plurality of objects.

10. The computing system of claim 1, wherein the repository is defined for the first application.

11. The computing system of claim 1, wherein the repository is a first repository, the operations further comprising:
creating a second repository defined for objects associated with both the first application and the second application; and
moving or copying at least a portion of the second plurality of objects to the second repository.

12. The computing system of claim 11, wherein moving or copying the at least a portion of the second plurality of objects comprises moving the at least a portion of the second plurality of objects.

13. The computing system of claim 1, wherein the repository is a first repository, the operations further comprising:
creating a second repository defined for objects associated with both the first application and the second application; and
storing at least a portion of the second plurality of objects in the second repository, wherein receiving a second plurality of objects comprises receiving objects of the second plurality of objects from the second repository.

14. The computing system of claim 13, wherein objects of the second plurality of objects received by the first repository are removed from the second repository.

15. The computing system of claim 1, wherein the repository is a first repository, the operations further comprising:
creating a second repository defined for objects associated with both the first application and the second application;
storing at least a portion of the first plurality of objects, or references thereto, and at least a portion of the second plurality of objects, or references thereto, in the second repository; and
defining a third package that comprises at least a portion of the second plurality of objects.

16. The computing system of claim 15, wherein the at least a portion of the second plurality of objects are removed from the first repository.

17. One or more computer-readable storage media comprising:
computer-executable instructions that, when executed by a computing system comprising at least one hardware processor and at least one memory coupled to the at least one hardware processor, cause the computing system to receive a first plurality of objects useable by a first application;
computer-executable instructions that, when executed by the computing system, cause the computing system to store the first plurality of objects, or references to the first plurality of objects, in a repository;
computer-executable instructions that, when executed by the computing system, cause the computing system to receive a second plurality of objects useable by the first application when a second application is also installed at a client system;
computer-executable instructions that, when executed by the computing system, cause the computing system to store the second plurality of objects, or references to the second plurality of objects, in the repository;
computer-executable instructions that, when executed by the computing system, cause the computing system to define a first package that comprises at least a portion of the first plurality of objects but does not comprise objects of the second plurality of objects useable by the first application when the second application is also installed at the client system;
computer-executable instructions that, when executed by the computing system, cause the computing system to define a second package that comprises at least a portion of the second plurality of objects useable by the first application when the second application is also installed at the client system;
computer-executable instructions that, when executed by the computing system, cause the computing system to determine that a first client computing system has the first application installed but does not have the second application installed;
computer-executable instructions that, when executed by the computing system, cause the computing system to deploy the first package and not the second package to the first client computing system;
computer-executable instructions that, when executed by the computing system, cause the computing system to determine that a second client computing system has both the first application and the second application installed; and
computer-executable instructions that, when executed by the computing system, cause the computing system to deploy at least the second package to the second client computing system.

18. A method, implemented in a computing environment comprising a computing system comprising at least one hardware processor and at least one memory coupled to the at least one hardware processor, the method comprising:
receiving a first plurality of objects useable by a first application;
storing the first plurality of objects, or references to the first plurality of objects, in a repository;
receiving a second plurality of objects useable by the first application when a second application is also installed at a client system;
storing the second plurality of objects, or references to the second plurality of objects, in the repository;
defining a first package that comprises at least a portion of the first plurality of objects but does not comprise objects of the second plurality of objects useable by the first application when the second application is also installed at the client system;
defining a second package that comprises at least a portion of the second plurality of objects useable by the first application when the second application is also installed at the client system;
determining that a first client computing system has the first application installed but does not have the second application installed;
deploying the first package and not the second package to the first client computing system;

determining that a second client computing system has both the first application and the second application installed; and deploying at least the second package to the second client computing system.

19. The method of claim 18, further comprising:

storing the first package and the second package in the repository, wherein the first package and the second page are contemporaneously stored in the repository.

20. The one or more computer-readable storage media of claim 17, further comprising:

computer-executable instructions that, when executed by the computing system, cause the computing system to store the first package and the second package in the repository, wherein the first package and the second page are contemporaneously stored in the repository.

\* \* \* \* \*